United States Patent
Zhou et al.

(10) Patent No.: US 12,328,217 B2
(45) Date of Patent: Jun. 10, 2025

(54) SYNCHRONIZATION SIGNAL BLOCK TRANSMITTING AND RECEIVING METHOD AND DEVICE

(71) Applicant: SPREADTRUM COMMUNICATIONS (SHANGHAI) CO., LTD., Shanghai (CN)

(72) Inventors: Huayu Zhou, Shanghai (CN); Shaofei Wang, Shanghai (CN); Lanlan Li, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/321,633

(22) PCT Filed: Jan. 21, 2019

(86) PCT No.: PCT/CN2019/072470
§ 371 (c)(1),
(2) Date: Oct. 19, 2020

(87) PCT Pub. No.: WO2019/157904
PCT Pub. Date: Aug. 22, 2019

(65) Prior Publication Data
US 2021/0044471 A1    Feb. 11, 2021

(30) Foreign Application Priority Data

Feb. 13, 2018 (CN) .......................... 201810153251.1

(51) Int. Cl.
*H04L 27/26* (2006.01)
*H04W 16/14* (2009.01)
*H04W 56/00* (2009.01)

(52) U.S. Cl.
CPC ...... *H04L 27/2657* (2013.01); *H04L 27/2662* (2013.01); *H04W 16/14* (2013.01); *H04W 56/001* (2013.01)

(58) Field of Classification Search
CPC ............ H04L 27/2657; H04L 27/2662; H04L 27/2602; H04L 27/2601; H04L 27/26025;
(Continued)

(56) References Cited

U.S. PATENT DOCUMENTS

| 2006/0050626 | A1 | 3/2006 | Yucek et al. |
| 2016/0135179 | A1* | 5/2016 | Yin .................... H04J 11/0069 370/329 |

FOREIGN PATENT DOCUMENTS

| CN | 104301273 | 1/2015 |
| CN | 105451251 | 3/2016 |

(Continued)

OTHER PUBLICATIONS

Chinese Office Action issued on Sep. 21, 2020 in CN Application No. 201810153251.1.
(Continued)

*Primary Examiner* — Sudesh M Patidar
(74) *Attorney, Agent, or Firm* — Occhiuti & Rohlicek LLP

(57) ABSTRACT

Provided is a method and device for transmitting and receiving a Synchronization Signal block (SS-block). The method for transmitting the SS-block includes: configuring the SS-block in an NR unlicensed spectrum, wherein the SS-block occupies x OFDM symbols, with x being a positive integer no greater than 4; and transmitting the S S-block to a user equipment with a preset or configured subcarrier spacing. By this method, during the configuration of SS-block, the SS-block occupies x Orthogonal Frequency Divi-
(Continued)

sion Multiplexing symbols. If the SS-block occupies a relatively small number of symbols, it is possible to reduce the duty cycle of DRS. In other words, it is possible to shorten the transmission duration of the SS-block, so as to reduce the time that the SS-block occupies the channel in the unlicensed spectrum.

45 Claims, 7 Drawing Sheets

(58) Field of Classification Search
CPC ............... H04L 27/2613; H04L 27/261; H04L 27/2655; H04L 5/00; H04L 5/0053; H04W 16/14; H04W 56/001; H04W 74/0841; H04W 74/00; H04W 74/02; H04W 74/004; H04W 74/008; H04W 74/08; H04W 74/0875; H04W 74/0833; H04W 74/04; H04W 74/0866; H04W 72/1263; H04W 72/1268; H04W 72/1273; H04W 72/048; H04W 72/04; H04W 72/1278; H04J 11/0086
See application file for complete search history.

(56) References Cited

U.S. PATENT DOCUMENTS

| | | | | |
|---|---|---|---|---|
| 2016/0309454 | A1* | 10/2016 | Han | H04L 5/0007 |
| 2016/0366576 | A1* | 12/2016 | You | H04J 11/0069 |
| 2017/0238272 | A1* | 8/2017 | You | H04L 5/001 |
| | | | | 370/350 |
| 2017/0280331 | A1 | 9/2017 | Gou et al. | |
| 2018/0084593 | A1* | 3/2018 | Chen | H04L 5/0048 |
| 2018/0159926 | A1* | 6/2018 | Sun | H04W 56/0015 |
| 2018/0316454 | A1* | 11/2018 | Damnjanovic | H04J 11/0086 |
| 2019/0028253 | A1* | 1/2019 | Ahn | H04W 48/16 |
| 2019/0037509 | A1* | 1/2019 | Li | H04L 5/0007 |
| 2019/0110242 | A1* | 4/2019 | Islam | H04J 11/0069 |
| 2019/0124533 | A1* | 4/2019 | Tenny | H04L 5/0048 |
| 2019/0150202 | A1* | 5/2019 | Harada | H04W 74/0808 |
| | | | | 370/329 |
| 2020/0084752 | A1* | 3/2020 | Åström | H04W 56/001 |
| 2020/0112846 | A1* | 4/2020 | Moon | H04J 11/0073 |
| 2020/0119966 | A1* | 4/2020 | Takeda | H04W 72/04 |
| 2020/0162198 | A1* | 5/2020 | Seo | H04L 5/0091 |
| 2020/0163037 | A1* | 5/2020 | Zheng | H04W 74/0808 |
| 2020/0245313 | A1* | 7/2020 | Ni | H04L 27/2602 |
| 2020/0288503 | A1* | 9/2020 | Sahlin | H04W 74/0833 |
| 2020/0366452 | A1* | 11/2020 | Tang | H04L 5/0051 |
| 2020/0383129 | A1* | 12/2020 | Ko | H04L 27/2607 |
| 2020/0396122 | A1* | 12/2020 | Da | H04W 48/12 |
| 2021/0045078 | A1* | 2/2021 | Shin | H04J 11/0076 |
| 2021/0176023 | A1* | 6/2021 | Nilsson | H04L 5/0007 |
| 2021/0176755 | A1* | 6/2021 | Liu | H04L 27/2602 |
| 2021/0360553 | A1* | 11/2021 | Atungsiri | H04L 27/2692 |

FOREIGN PATENT DOCUMENTS

| | | |
|---|---|---|
| CN | 105577339 | 5/2016 |
| CN | 106161317 | 11/2016 |
| CN | 106411805 | 2/2017 |
| CN | 107682133 | 2/2018 |
| WO | WO-2019096404 A1 * | 5/2019 |

OTHER PUBLICATIONS

Chinese Office Action issued on Mar. 17, 2021 in CN Application No. 201810153251.1.
Chinese Office Action issued in CN Application No. 201810153251.1.
PCT International Search Report, PCT/CN2019/072470, Mar. 27, 2019, 4 pgs.

* cited by examiner

SYNCHRONIZATION SIGNAL BLOCK TRANSMITTING AND RECEIVING METHOD AND DEVICE

CROSS REFERENCE TO RELATED APPLICATIONS

This application is a U.S. national stage application of the PCT International Application No. PCT/CN2019/072470 filed on Jan. 21, 2019, which claims the benefit of foreign priority of Chinese patent application No. 201810153251.1 filed on Feb. 13, 2018, the contents all of which are incorporated herein by reference.

TECHNICAL FIELD

The present disclosure relates to the field of mobile communications, in particular, to methods and devices for transmitting and receiving a synchronization signal block.

BACKGROUND

In a 5th-Generation (5G) system, a Primary Synchronization Signal (PSS), a Secondary Synchronization Signal (SSS), and a Physical Broadcast Channel (PBCH) are of the same Synchronization Signal block (SS-block). Each SS-block can be considered as a resource of a beam (analog domain) in a beam sweeping process. Multiple SS-blocks constitute a Synchronization Signal burst (SS-burst). An SS-burst can be considered as a relatively concentrated resource including multiple beams. Multiple SS-bursts constitute an SS-burst-set. In the beam sweeping process, the SS-block is repeatedly transmitted in different beams. With the training by the beam sweeping, the user equipment can sense the beam in which the strongest signal is received.

At present, with a rapid development of mobile services, the existing radio frequency capacity assigned for mobile communications is no longer sufficient for the increasing demands. Thus, a mechanism known as Licensed Assisted Access (LAA) has been introduced. In the LAA mechanism, the transmission of mobile communications can be carried in an unlicensed spectrum, e.g., in a frequency band of 5 GHz. Currently existing unlicensed spectrums are mainly used in Wi-Fi, Bluetooth, radar, medical systems, and the likes.

In the 5G New Radio (NR), a Discovery Reference Signal (DRS), a measurement window, or a set of reference signal in the measurement window needs to be configured for synchronization (time-frequency track) and measurement by the user equipment on cells in the unlicensed spectrum. It is required that the DRS in the 5G NR unlicensed spectrum includes a SS-block so that the user equipment is enabled to detect the NR unlicensed spectrum cell in a cell search. However, the SS-block of the prior technical standards is no longer applicable for the NR unlicensed spectrum due to, e.g., excessively long duration of transmission.

Therefore, there is a need of a new configuration method for SS-block.

SUMMARY

The present disclosure intends to solve the problem of the demand of a new configuration method for SS-block.

To solve this problem, a method for transmitting a SS-block is provided in the embodiments of the present disclosure; the method comprises configuring the SS-block in an NR unlicensed spectrum with the SS-block occupying x Orthogonal Frequency Division Multiplexing (OFDM) symbols; x being a positive integer no greater than 4. The method further comprises transmitting the SS-block to a user equipment with a preset or configured subcarrier spacing.

Alternatively, the SS-block comprises a Primary Synchronization Signal (PSS), a Secondary Synchronization Signal (SSS), and a Physical Broadcast Channel (PBCH).

Alternatively, when the SS-block occupies 1 OFDM symbol, the PSS, the SSS, and the PBCH occupy the OFDM symbol in a manner of frequency division multiplexing.

Alternatively, when the SS-block occupies 2 OFDM symbols, the PSS and the SSS occupy 1 OFDM symbol in a manner of frequency division multiplexing, and the PBCH occupies 1 OFDM symbol.

Alternatively, when the SS-block occupies 2 OFDM symbols, each of the PSS and the SSS occupies 1 OFDM symbol, and the OFDM symbols occupied by the PSS and the SSS are subjected to a frequency division multiplexing by the PBCH.

Alternatively, when the SS-block occupies 3 OFDM symbols, each of the PSS, the SSS, and the PBCH occupies 1 OFDM symbol.

Alternatively, the PBCH utilizes a frequency domain resource in the OFDM symbols which are occupied by the PSS and the SSS.

Alternatively, when the SS-block occupies 3 OFDM symbols, the PSS and the SSS occupy 1 OFDM symbol in a manner of frequency division multiplexing, and the PBCH occupies 2 OFDM symbols.

Alternatively, when the SS-block occupies 4 OFDM symbols, the PSS occupies 1 OFDM symbol, the SSS occupies 1 OFDM symbol, and the PBCH occupies 2 OFDM symbols.

Alternatively, the PBCH utilizes a frequency domain resource in the OFDM symbol which is occupied by the SSS.

Alternatively, the PBCH occupies P consecutive physical resource blocks, with P being a number of physical resource blocks which are occupied by the PBCH in 1 SS-block.

Alternatively, the SS-block comprises the PSS and the SSS.

Alternatively, when the SS-block occupies 1 OFDM symbol, the PSS and the SSS occupy the OFDM symbol in a manner of frequency division multiplexing.

Alternatively, when the SS-block occupies 2 OFDM symbols, the PSS occupies 1 OFDM symbol, and the SSS occupies 1 OFDM symbol.

Alternatively, y OFDM symbols are preceding or following the OFDM symbol occupied by the SS-block. In these y OFDM symbols, a base station transmits a physical downlink control channel, a control resource set, a channel state information reference signal or a demodulation reference signal, with y being zero or a positive integer.

Alternatively, the y OFDM symbols and one preceding or following SS-block constitute an integral resource unit.

Alternatively, one or more of the integral resource units are continuously transmitted; they can be transmitted in a duration of the DRS, in a measurement window, or in a duration of reference signal corresponding to the measurement window.

Alternatively, a plurality of the integral resource units is subjected to a frequency division multiplexing.

Alternatively, a preset transmission timing for the integral resource unit is set in a preset OFDM symbol.

Alternatively, the method further comprises, before transmitting the integral resource unit to the user equipment, performing a pre-transmission monitoring; if a channel is monitored as being idle, transmitting the integral resource unit to the user equipment at the preset transmission timing; if the channel is monitored as being busy, postponing the transmission of the integral resource unit and indicating a postponed time to the user equipment.

Alternatively, the method further comprises, before transmitting the integral resource unit to the user equipment, performing a pre-transmission monitoring; if a channel is monitored as being idle, transmitting the integral resource unit to the user equipment at the preset transmission timing; if the channel is monitored as being busy, cancelling the transmission of the integral resource unit.

Alternatively, the postponed time indicated by a base station is carried by a demodulation reference signal in the PBCH, by a master information block in the PBCH, or by a demodulation reference signal in the physical downlink control channel associated with the SS-block.

Alternatively, the preset or configured subcarrier spacing is 30 kHz.

Alternatively, the preset or configured subcarrier spacing is 60 kHz.

Alternatively, when x is 1, 2, or 3, the base station transmits 4 SS-blocks in one time slot.

Alternatively, when x is 1, the base station transmits 8 SS-blocks in one time slot.

The present disclosure further provides a method for receiving a SS-block. The method comprises receiving the SS-block configured in an NR unlicensed spectrum. The SS-block occupies x OFDM symbols, with x being a positive integer no greater than 4.

Alternatively, the method further comprises: if the transmission of the SS-block is postponed, receiving a postponed time. As a result, when a user equipment is performing a cell search, timing information of a searched cell can be obtained according to the postponed time and a time index for the SS-block.

Alternatively, y OFDM symbols are preceding or following the OFDM symbol occupied by the SS-block. In these y OFDM symbols, a base station transmits a physical downlink control channel, a control resource set, a channel state information reference signal or a demodulation reference signal, with y being zero or a positive integer.

The present disclosure also provides a device for transmitting the SS-block. The device comprises a memory and a processor. The memory stores a computer program executable on the processor. When the computer program is executed, the processor is caused to configure the SS-block in an NR unlicensed spectrum, with the SS-block occupying x OFDM symbols; x being a positive integer no greater than 4. The processor is caused to transmit the SS-block to a user equipment with a preset or configured subcarrier spacing.

Alternatively, the SS-block comprises a Primary Synchronization Signal (PSS), a Secondary Synchronization Signal (SSS), and a Physical Broadcast Channel (PBCH).

Alternatively, when the SS-block occupies 1 OFDM symbol, the PSS, the SSS, and the PBCH occupy the OFDM symbol in a manner of frequency division multiplexing.

Alternatively, when the SS-block occupies 2 OFDM symbols, the PSS and the SSS occupy 1 OFDM symbol in a manner of frequency division multiplexing, and the PBCH occupies 1 OFDM symbol.

Alternatively, when the SS-block occupies 2 OFDM symbols, each of the PSS and the SSS occupies 1 OFDM symbol, and the OFDM symbols occupied by the PSS and the SSS are subjected to a frequency division multiplexing by the PBCH.

Alternatively, when the SS-block occupies 3 OFDM symbols, each of the PSS, the SSS, and the PBCH occupies 1 OFDM symbol.

Alternatively, the PBCH utilizes a frequency domain resource in the OFDM symbols which are occupied by the PSS and the SSS.

Alternatively, when the SS-block occupies 3 OFDM symbols, the PSS and the SSS occupy 1 OFDM symbol in a manner of frequency division multiplexing, and the PBCH occupies 2 OFDM symbols.

Alternatively, when the SS-block occupies 4 OFDM symbols, the PSS occupies 1 OFDM symbol, the SSS occupies 1 OFDM symbol, and the PBCH occupies 2 OFDM symbols.

Alternatively, the PBCH utilizes a frequency domain resource in the OFDM symbol which is occupied by the SSS.

Alternatively, the PBCH occupies P consecutive physical resource blocks, with P being a number of physical resource blocks which are occupied by the PBCH in 1 SS-block.

Alternatively, the SS-block comprises the PSS and the SSS.

Alternatively, when the SS-block occupies 1 OFDM symbol, the PSS and the SSS occupy the symbol in a manner of frequency division multiplexing.

Alternatively, when the SS-block occupies 2 OFDM symbols, the PSS occupies 1 OFDM symbol, and the SSS occupies 1 OFDM symbol.

Alternatively, y OFDM symbols are preceding or following the OFDM symbol occupied by the SS-block. In these y OFDM symbols, a base station transmits a physical downlink control channel, a control resource set, a channel state information reference signal or a demodulation reference signal, with y being zero or a positive integer.

Alternatively, the y OFDM symbols and one preceding or following SS-block constitute an integral resource unit.

Alternatively, one or more of the integral resource units are continuously transmitted; they can be transmitted in a duration of the DRS, in a measurement window, or in a duration of reference signal corresponding to the measurement window.

Alternatively, a plurality of the integral resource units is subjected to a frequency division multiplexing.

Alternatively, a preset transmission timing for the integral resource unit is set in a preset OFDM symbol.

Alternatively, before transmitting the integral resource unit to the user equipment, the computer program further causes the processor to: perform a pre-transmission monitoring; if a channel is monitored as being idle, transmit the integral resource unit to the user equipment at the preset transmission timing; if the channel is monitored as being busy, postpone the transmission of the integral resource unit and indicate a postponed time to the user equipment.

Alternatively, before transmitting the integral resource unit to the user equipment, the computer program further causes the processor to: perform a pre-transmission monitoring; if a channel is monitored as being idle, transmit the integral resource unit to the user equipment at the preset transmission timing; if the channel is monitored as being busy, cancel the transmission of the integral resource unit.

Alternatively, the postponed time indicated by a base station is carried by a demodulation reference signal in the PBCH, by a master information block in the PBCH, or by a demodulation reference signal in the physical downlink control channel associated with the SS-block.

Alternatively, the preset or configured subcarrier spacing is 30 kHz.

Alternatively, the preset or configured subcarrier spacing is 60 kHz.

Alternatively, when x is 1, 2, or 3, the base station transmits 4 SS-blocks in one time slot.

Alternatively, when x is 1, the base station transmits 8 SS-blocks in one time slot.

The present disclosure further provides a device for receiving SS-block. The device comprises a memory and a processor. The memory stores a computer program executable on the processor; and when the computer program is executed, the processor is caused to receive a SS-block configured in an NR unlicensed spectrum. The SS-block occupies x OFDM symbols, with x being a positive integer no greater than 4.

Alternatively, the processor is further caused to: if the transmission of the SS-block is postponed, postponing a receiving time. As a result, when a user equipment is performing a cell search, timing information of a searched cell can be obtained according to the postponed time and a time index for the SS-block.

Alternatively, y OFDM symbols are preceding or following the OFDM symbol occupied by the SS-block. In these y OFDM symbols, a base station transmits a physical downlink control channel, a control resource set, a channel state information reference signal or a demodulation reference signal, with y being zero or a positive integer.

Compared to the prior art, the technical solutions according to the embodiments of the present disclosure has the following advantages.

In the configuration of the SS-block, the SS-block occupies x OFDM (Orthogonal Frequency Division Multiplexing) symbols. If the SS-block occupies a relatively small number of symbols, the duty cycle for a discovery reference signal can be reduced. In other words, the duration of the transmission of the SS-block can be reduced, thereby reducing the time that the SS-block occupies the channel in the unlicensed spectrum.

Furthermore, the SS-block is continuously transmitted within the duration of the DRS, and the SS-block and the preceding y OFDM symbols constitute an entirety to be transmitted continuously within the duration of the DRS; these can both reduce the duty cycle of the discovery reference signal.

DETAILED DESCRIPTION

The 3GPP (3rd Generation Partnership Project) Protocol LTE (Long Term Evolution) Release 12 series defines the DRS, which is used for the synchronization (time-frequency track) and the measurement by the user equipment on secondary cells, and serves as the "Discovery" function for secondary cells. An advantage of employing DRS is that DRS lies in long-term signal which has little interference to the entire network. The DRS is comprised of PSS, SSS, and Cell-specific Reference Signal (CRS). For a frequency division duplex system, the duration of DRS is 1 to 5 consecutive subframes. For a time division duplex system, the duration of DRS is 2 to 5 consecutive subframes.

It is also needed to define the DRS in an NR unlicensed spectrum so that cells in the NR unlicensed spectrum has a discovery function. The DRS need to include a SS-block so that the user equipment can detect an NR unlicensed spectrum cell in the cell search, and the SS-block can be transmitted at a proper time.

Figure 1:
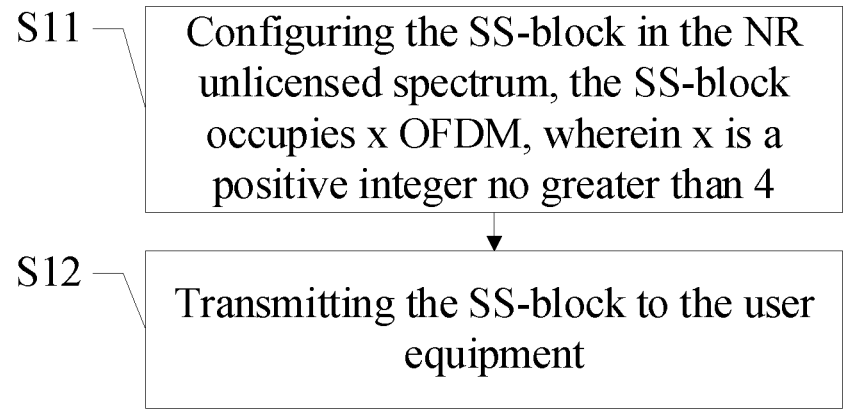
FIG. 1 is a flowchart of the method for transmitting SS-block according to an embodiment of the present disclosure.

FIG. 1 is a flowchart of the method for transmitting SS-block according to an embodiment of the present disclosure. In particular, the method can comprise the following steps.

In a step S11, the SS-block is configured in the NR unlicensed spectrum. The SS-block occupies x OFDM, wherein x is a positive integer no greater than 4.

The SS-block is configured in the NR unlicensed spectrum. The SS-block is located in the DRS of the NR unlicensed spectrum. In an embodiment, the SS-block may include the PSS, the SSS, and the PBCH.

In some embodiments, the duration of the DRS is of 12 OFDM symbols in a non-empty time slot. The SS-block may occupy 1, 2, 3, or 4 OFDM symbols in the DRS. When the SS-block occupies a relatively small number of OFDM symbols, the duty cycle of the DRS may be reduced, which in turn reduces the time that the SS-block occupies the channel in the unlicensed spectrum.

The physical resource blocks occupied by the PSS, the SSS, and the PBCH as described below are physical resource blocks occupied nominally. Some of the physical resource blocks may be of zero power transmission, but still considered as belonging to the PSS, the SSS, or the PBCH. Moreover, the term "occupy" does not mean a complete occupation of all resources.

In some embodiments, the SS-block may occupy 1 OFDM symbol. The symbol is subjected to a frequency division multiplexing by the PSS, the SSS, and the PBCH of the SS-block. The PBCH occupies P consecutive physical resource blocks in frequency domain, so that the reception of the PBCH is within a continuous bandwidth, wherein P is the number of physical resource blocks occupied by the PBCH in one SS-block. For example, in an embodiment of the present disclosure, P may be 72.

Figures 2, 3:
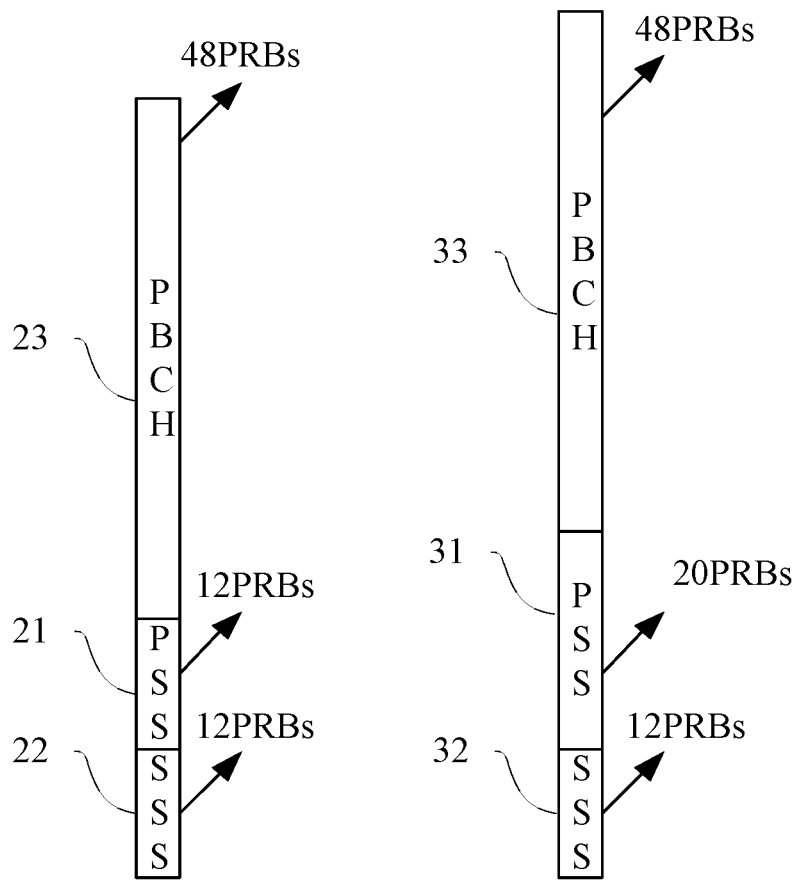
FIGS. 2 to 18 are schematic diagrams of the configurations of SS-block according to an embodiment of the present disclosure.

In an embodiment, referring to FIG. 2, when the SS-block occupies 1 OFDM symbol, each of the PSS 21 and the SSS 22 occupies 12 physical resource blocks; the PBCH 23 occupies 48 physical resource blocks; and the total bandwidth of the SS-block is 72 physical resource blocks.

In a variation, referring to FIG. 3, when the SS-block occupies 1 OFDM symbol, the PSS 31 occupies 20 physical resource blocks; the SSS 32 occupies 12 physical resource blocks; the PBCH 33 occupies 48 physical resource blocks; and the total bandwidth of the SS-block is 80 physical resource blocks.

The SS-block may occupy 2 OFDM symbols, and on each symbol 40 physical resource blocks are occupied. Since the SS-block in the Release 15 NR occupies 4 OFDM symbols, and on each symbol 20 physical resource blocks are occupied, one configuration is to have two arbitrary physical resource block sets combined directly in one symbol, with each physical resource block set being 20 physical resource blocks in one symbol of the Release 15 NR.

In some embodiments, the SS-block may occupy 2 OFDM symbols, wherein the PSS and the SSS occupy 1 symbol in a manner of frequency division multiplexing; and the PBCH occupies 1 symbol. The physical resource blocks occupied by the PBCH are consecutive in frequency domain so that the reception of the PBCH is within a continuous bandwidth.

Figure 4:
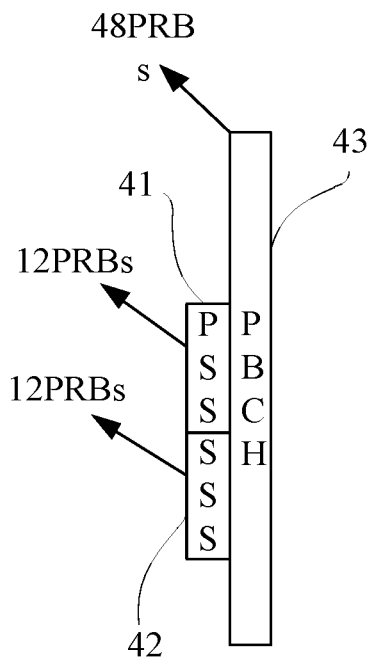
Figure 5:
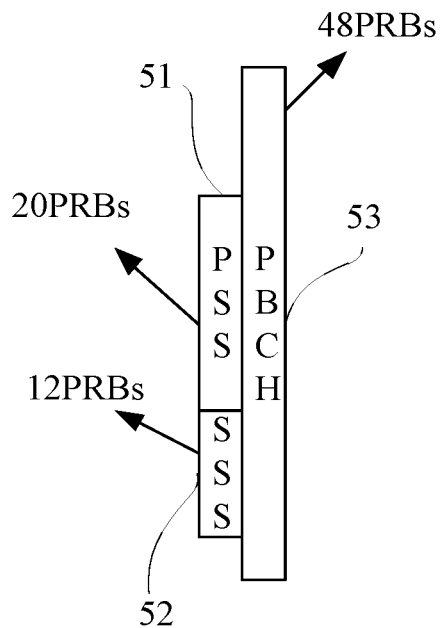

In an embodiment, referring to FIG. 4, when the SS-block occupies 2 OFDM symbols, each of the PSS 41 and the SSS 42 occupies 12 physical resource blocks; the PBCH 43 occupies 48 physical resource blocks; and the total bandwidth of the SS-block is 48 physical resource blocks.

In a variation, when the SS-block occupies 2 OFDM symbols, the PSS 51 occupies 20 physical resource blocks, the SSS 52 occupies 12 physical resource blocks, the PBCH 53 occupies 48 physical resource blocks, and the total bandwidth of the SS-block is 48 physical resource blocks.

In some embodiments, the PBCH may utilize the frequency domain resource in the OFDM symbols occupied by the PSS and the SSS to reduce the overall bandwidth of the SS-block.

Figure 6:
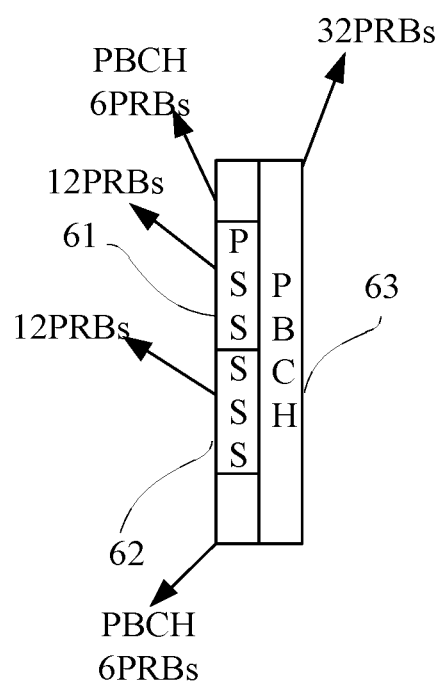

In an embodiment, referring to FIG. 6, when the SS-block occupies 2 OFDM symbols, each of the PSS 61 and the SSS 62 occupies 12 physical resource blocks, the PBCH 63 occupying one OFDM symbol on its own occupies 36 physical resource blocks, the PBCH 63 expanding to the OFDM symbol occupied by the PSS 61 and the SSS 62 occupies 12 physical resource blocks, and the total bandwidth of the SS-block is 36 physical resource blocks.

Figure 7:
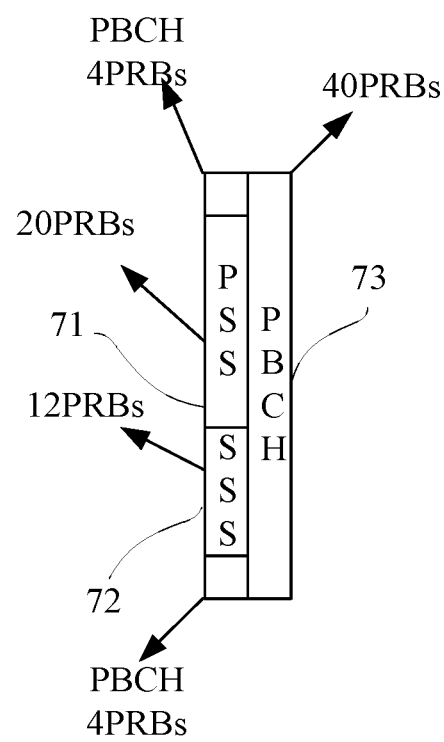

In a variation, referring to FIG. 7, when the SS-block occupies 2 OFDM symbols, the PSS 71 occupies 20 physical resource blocks, the SSS 72 occupies 12 physical resource blocks, the PBCH 73 occupying one OFDM symbol on its own occupies 40 physical resource blocks, the PBCH 73 expanding to the OFDM symbol occupied by the PSS 71 and the SSS 72 occupies 8 physical resource blocks, and the total band width of the SS-block is 40 physical resource blocks.

In some embodiments, the SS-block occupies 2 OFDM symbols, wherein each of the PSS and the SSS occupies 1 OFDM symbol, and the OFDM symbols occupied by the PSS and the SSS are subjected to a frequency division multiplexing by the PBDH.

Figure 8:
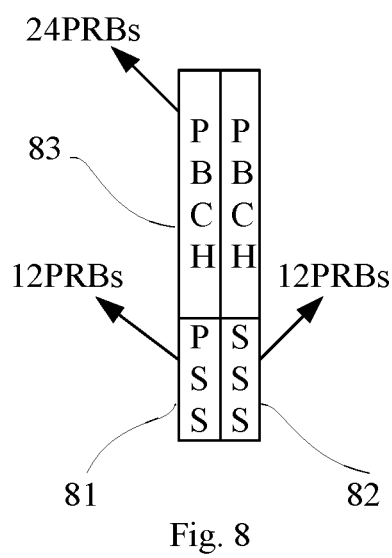

In an embodiment, referring to FIG. 8, when the SS-block occupies 2 OFDM symbols, each of the PSS 81 and the SSS 82 occupies 12 physical resource blocks, the OFDM symbols occupied by the PSS 81 and the SSS 82 are subjected to a frequency division multiplexing by the PBCH 83, the PBCH 83 occupies 24 physical resource blocks in each of the two OFDM symbols, and the total bandwidth of the SS-block is 36 physical resource blocks.

Figure 9:
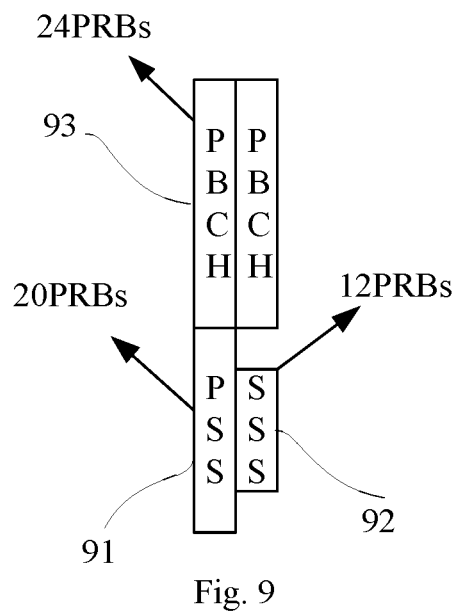

In a variation, referring to FIG. 9, when the SS-block occupies 2 OFDM symbols, the PSS 91 occupies 20 physical resource blocks, the SSS 92 occupies 12 physical resource blocks, the OFDM symbols occupied by the PSS 91 and the SSS 92 are subjected to a frequency division multiplexing by the PBCH 93, the PBCH 93 occupies 24 physical resource blocks in each of the two OFDM symbols, and the total bandwidth of the SS-block is 44 physical resource blocks.

Figure 10:
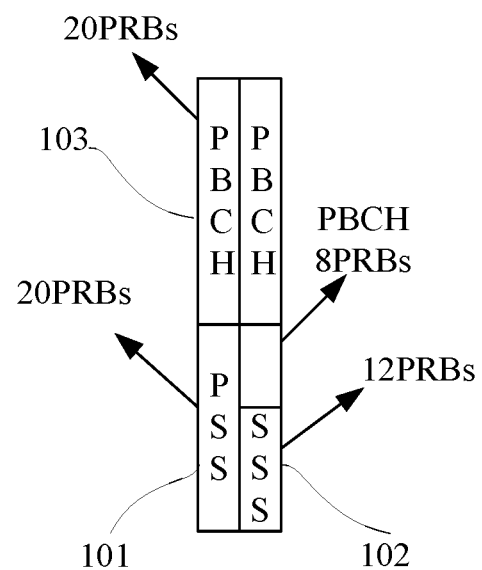

In a variation, referring to FIG. 10, when the SS-block occupies 2 OFDM symbols, the PSS 101 occupies 20 physical resource blocks, the SSS 102 occupies 12 physical resource blocks, the OFDM symbols occupied by the PSS 101 and the SSS 102 are subjected to a frequency division multiplexing by the PBCH 103, the PBCH 103 occupies 20 and 28 physical resource blocks respectively in the two OFDM symbols, and the total bandwidth of the SS-block is 40 physical resource blocks.

In some embodiments, the SS-block may occupy 3 OFDM symbols, wherein the PSS, the SSS and the PBCH each occupy 1 OFDM symbol. The physical resource blocks occupied by the PBCH are consecutive in frequency domain so that the reception of the PBCH is within a continuous bandwidth. Meanwhile, before the reception of the SSS is completed, the user equipment needs to open the bandwidth of the PSS or the SSS only.

Figure 11:
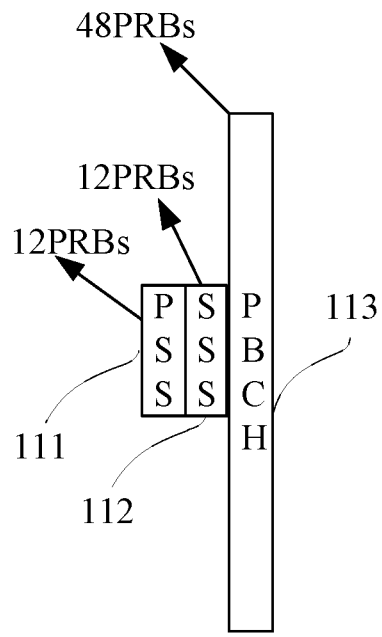

In an embodiment, referring to FIG. 11, when the SS-block occupies 3 OFDM symbols, each of the PSS 111 and the SSS 112 occupies 12 physical resource blocks, the PBCH 113 occupies 48 physical resource blocks, and the total bandwidth of the SS-block is 48 physical resource blocks.

Figure 12:
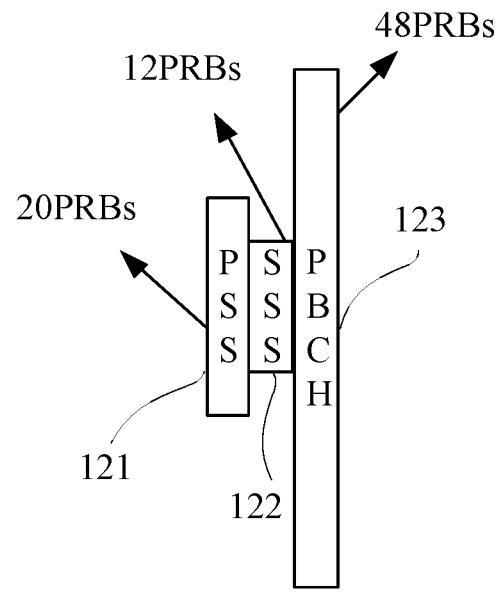

In a variation, referring to FIG. 12, when the SS-block occupies 3 OFDM symbols, the PSS 121 occupies 20 physical resource blocks, the SSS 122 occupies 12 physical resource blocks, the PBCH 123 occupies 48 physical resource blocks, and the total bandwidth of the SS-block is 48 physical resource blocks.

In some embodiments, the PBCH may utilize the frequency domain resource in the OFDM symbols occupied by the PSS and the SSS to reduce the overall bandwidth of the SS-block.

Figure 13:
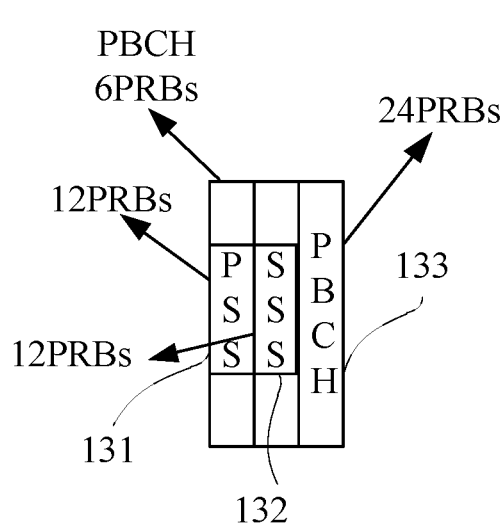

In an embodiment, referring to FIG. 13, when the SS-block occupies 3 OFDM symbols, each of the PSS 131 and the SSS 132 occupies 12 physical resource blocks, the PBCH 133 occupying one OFDM symbol on its own occupies 24 physical resource blocks, the PBCHs 133 expanding to the OFDM symbols occupied by the PSS 131 and the SSS 132 each occupies 12 physical resource blocks, and the total bandwidth of the SS-block is 24 physical resource blocks.

Figure 14:
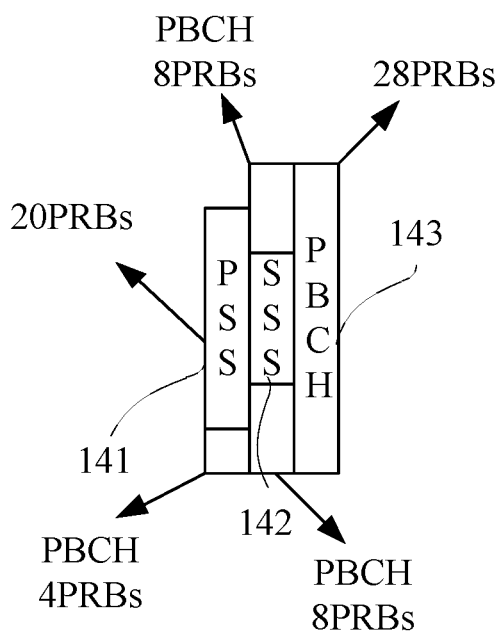

In a variation, referring to FIG. 14, when the SS-block occupies 3 OFDM symbols, the PSS 141 occupies 20 physical resource blocks, the SSS 142 occupies 12 physical resource blocks, the PBCH 143 occupying one OFDM symbol on its own occupies 28 physical resource blocks, the PBCH 143 expanding to the OFDM symbol occupied by the PSS 141 and that expanding to the OFDM symbol occupied by the SSS 142 occupy 4 and 16 physical resource blocks respectively, and the total bandwidth of the SS-block is 40 physical resource blocks.

In some embodiments, the SS-block may occupy 3 OFDM symbols, wherein the PSS and the SSS occupy 1 OFDM symbol in a manner of frequency division multiplexing; and the PBCH occupies 2 OFDM symbols. The physical resource blocks occupied by the PBCH are consecutive in frequency domain so that the reception of the PBCH is within a continuous bandwidth.

Figure 15:
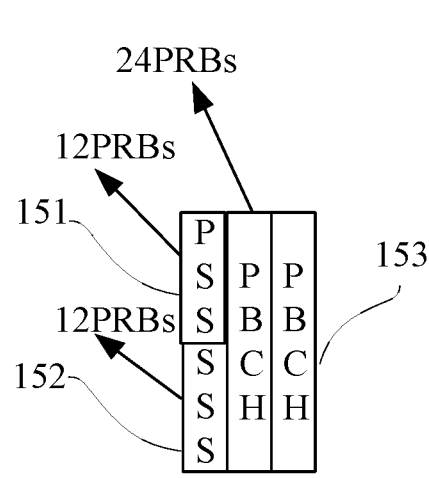

In an embodiment, referring to FIG. 15, when the SS-block may occupy 3 OFDM symbols, each of the PSS 151 and the SSS 152 occupies 12 physical resource blocks, the PBCH 153 occupies 24 physical resource blocks in each of the two OFDM symbols, and the total bandwidth of the SS-block is 24 physical resource blocks.

Figure 16:
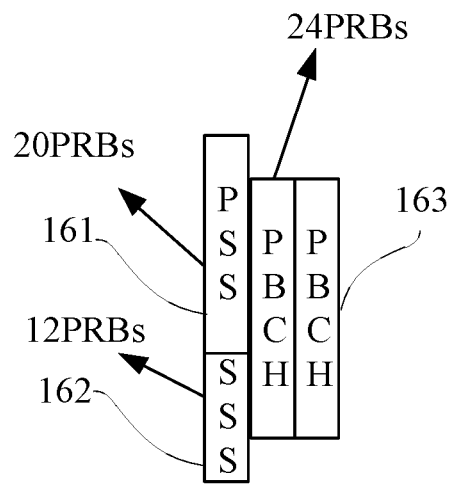

In a variation, referring to FIG. 16, when the SS-block occupies 3 OFDM symbols, the PSS 161 occupies 20 physical resource blocks, the SSS 162 occupies 12 physical resource blocks, the PBCH 163 occupies 24 physical resource blocks in each of the two OFDM symbols, and the total bandwidth of the SS-block is 24 physical resource blocks.

In some embodiments, the SS-block may occupy 4 OFDM symbols, wherein the PSS and the SSS each occupies 1 OFDM symbol, and the PBCH occupies 2 OFDM symbols. The physical resource blocks occupied by the PBCH are consecutive in frequency domain so that the reception of the PBCH is within a continuous bandwidth. Meanwhile, before the reception of the SSS is completed, the user equipment needs to open the bandwidth of the PSS or the SSS only.

In some embodiments, the PBCH may utilize the frequency domain resource in the OFDM symbol occupied by the SSS so as to reduce the overall bandwidth of the SS-block.

Figure 17:
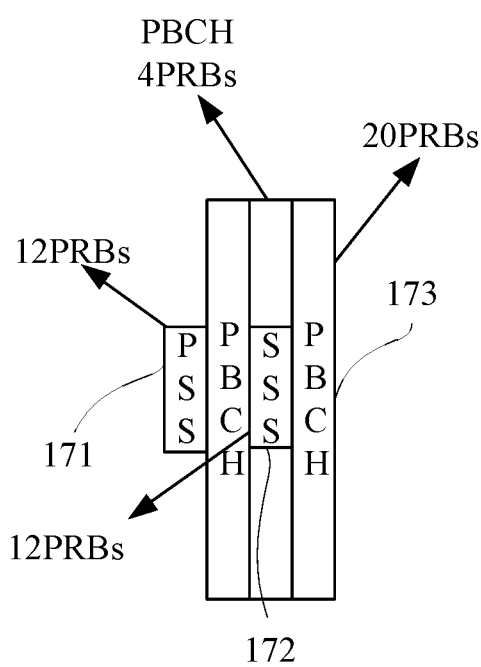

In an embodiment, referring to FIG. 17, when the SS-block occupies 4 OFDM symbols, each of the PSS 171 and the SSS 172 occupies 12 physical resource blocks; the PBCH 173 occupies 20 physical resource blocks in each of two OFDM symbols, the PBCH 173 expending to the OFDM symbol occupied by the SSS 172 occupies 8 physical resource blocks, and the total bandwidth of the SS-block is 20 physical resource blocks.

Figure 18:
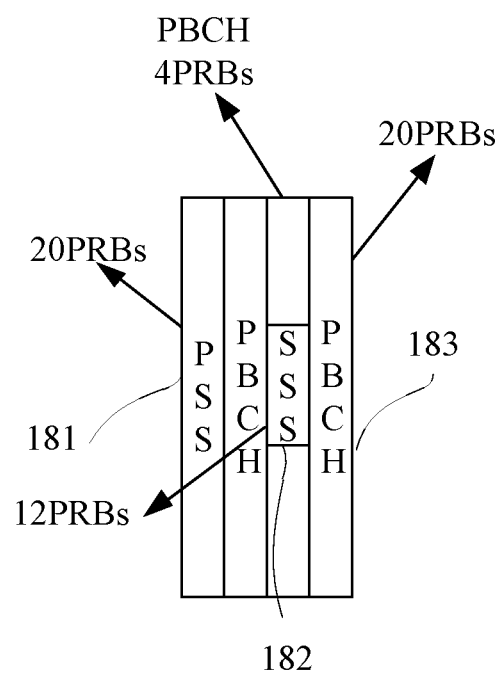

In a variation, referring to FIG. 18, when the SS-block occupies 4 OFDM symbols, the PSS 181 occupies 20 physical resource blocks, the SSS 182 occupies 12 physical resource blocks, the PBCH 183 occupies 20 physical resource blocks in each of two OFDM symbols, the PBCH 183 expanding to the OFDM symbol occupied by the SSS 182 occupies 8 physical resource blocks, and the total bandwidth of the SS-block is 20 physical resource blocks.

In a specific implementation, the SS-block comprises the PSS and the SSS. The SS-block may occupy 1 or 2 OFDM symbols. When the SS-block occupies a relatively small number of OFDM symbols, the duty cycle of the DRS is reduced, thereby reducing the time that the channel is occupied by the SS-block in the unlicensed spectrum.

In some embodiments, the SS-block may occupy 1 OFDM symbol. The symbol is subjected to a frequency division multiplexing by the PSS and the SSS in the SS-block.

In an embodiment, when the SS-block occupies 1 OFDM symbol, each of the PSS and the SSS occupies 12 physical resource blocks, and the total bandwidth of the SS-block is 24 physical resource blocks, with configuration structure similar to that in FIG. 2.

In a variation, when the SS-block occupies 1 OFDM symbol, the PSS occupies 20 physical resource blocks, the SSS occupies 12 physical resource blocks, and the total bandwidth of the SS-block is 32 physical blocks, with a configuration structure similar to that in FIG. 3.

In some embodiments, the SS-block may occupy 2 OFDM symbols, the PSS and the SSS in the SS-block each occupies 1 OFDM symbol.

In an embodiment, when the SS-block occupies 2 OFDM symbols, each of the PSS and the SSS occupies 12 physical resource blocks, and the total bandwidth of the SS-block is 12 physical resource blocks, with a configuration structure similar to that in FIG. 8.

In a variation, when the SS-block occupies 2 OFDM symbols, the PSS occupies 20 physical resource blocks, the SSS occupies 12 physical resource blocks, and the total bandwidth of the SS-block is 20 physical resource blocks, with a configuration structure similar to that in FIG. 9.

In a step S12, the SS-block is transmitted to the user equipment with a preset carrier spacing.

In some embodiments, when x is 1, 2, or 3, the base station transmits 4 SS-blocks in one time slot, which reduces the time that the channel is occupied.

In some embodiments, when x is 1, the base station transmits 8 SS-blocks in one time slot, which reduces the time that the channel is occupied.

In some embodiments, the preset or configured subcarrier spacing may be 30 kHz, in which case the structure of the SS-block with x being 1, 2, or 3 may be used, which reduces the time that the channel is occupied as compared to the case where the subcarrier spacing is 15 kHz.

In some embodiments, the preset or configured subcarrier spacing may be 60 kHz, in which case the structure of the SS-block with x being 4 may be used, which further reduces the time that the channel is occupied, with 8 SS-blocks being transmitted in 1 millisecond.

In some embodiments, the OFDM symbols occupied by the SS-block are consecutive. The DRS may include a plurality of SS-blocks, which reduces the duty cycle of the DRS.

In some embodiments, before or after the OFDM symbols occupied by the SS-block there are y OFDM symbols. The base station transmits in these y OFDM symbols a physical downlink control channel, a control resource set, channel state information reference signal or demodulation reference signal, wherein y is zero or a positive integer.

When the y symbols are occupied by the physical downlink control channel or the control resource set, the base station may transmit the SS-block and the physical downlink control channel simultaneously. The physical downlink control channel is used for the transmission of common control information (e.g., remain minimum system information, paging information, etc.), time slot format indicator, scheduling information, etc. The physical downlink control channel or the control resource set is associated with the SS-block.

When the y symbols are occupied by the channel state information reference signal or the demodulation reference signal, the base station may transmit the SS-block and the channel state information reference signal simultaneously to facilitate the operations by the user equipment such as the training on beam sweeping and the calculation of the channel state information.

In some embodiments, the y symbols and a SS-block constitute an integral resource unit. The OFDM symbols occupied by the integral resource unit are consecutive, which reduces the duty cycle of the DRS.

In some embodiments, a plurality of integral resource units is subjected to a frequency division multiplexing, so as to reduce the duty cycle for the transmission of the plurality of integral resource units.

In some embodiments, the DRS occurs in any one or more subframes in the Discovery Measurement Timing Configuration (DMTC) or the Synchronization Measurement Timing Configuration (SMTC), wherein a preset transmission time for the integral resource unit in the DRS is set in a preset OFDM symbol.

In some embodiments, one or more of the SS-blocks are transmitted continuously within the duration of the DRS, in the measurement window, or in the duration of the DRS corresponding to the measurement window, so as to reduce the duty cycle of the DRS.

In some embodiments, one or more of the integral resource unit is transmitted continuously within the duration of the DRS, in the measurement window, or in the duration of the DRS corresponding to the measurement window, so as to reduce the duty cycle of the DRS.

Figure 19:
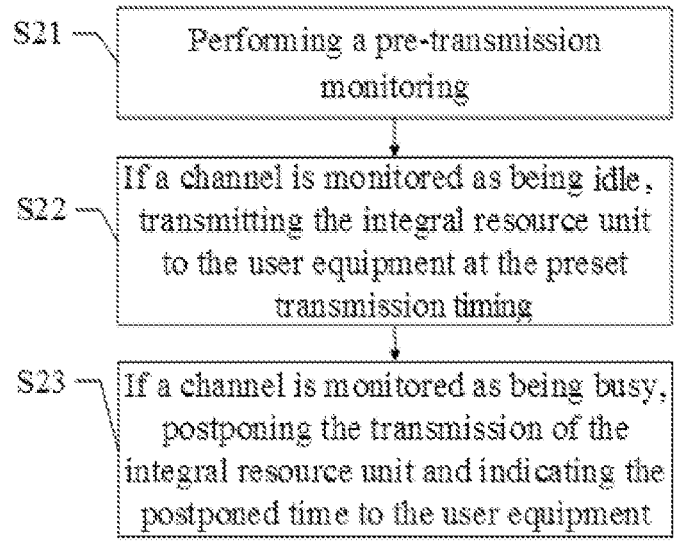
FIG. 19 is a partial flowchart of a specific implementation of S12 in FIG. 1.

Referring to FIG. 19 which shows a partial flow chart of a specific implementation of S12 in FIG. 1, before transmitting the integral resource unit to the user equipment, the method further comprises:

step S21 of performing a pre-transmission monitoring;

step S22 of, if a channel is monitored as being idle, transmitting the integral resource unit to the user equipment at the preset transmission time;

step S23 of, if a channel is monitored as being busy, postponing the transmission of the integral resource unit and indicating the postponed time to the user equipment.

In some embodiments, the integral resource unit includes the SS-black and y preceding or following symbols, wherein y is zero or a positive integer. In the case where y is zero, the integral resource unit is the SS-block. That is, for step S12, the SS-block is transmitted to the user equipment with the preset carrier spacing; while the pre-transmission monitoring and other steps in FIG. 19 are also performed before step S12.

Figure 20:
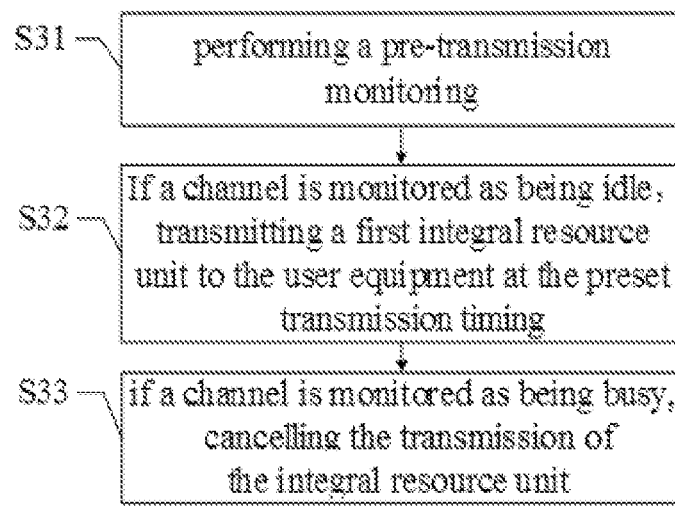
FIG. 20 is a partial flowchart of a specific implementation of S12 in FIG. 1.

Referring to FIG. 20 which shows a partial flow chart of another specific implementation of S12 in FIG. 1, before transmitting the integral resource unit to the user equipment, the method further comprises:

step S31 of performing a pre-transmission monitoring;

step S32 of, if a channel is monitored as being idle, transmitting the integral resource unit to the user equipment at the preset transmission time;

step S33 of, if a channel is monitored as being busy, cancelling the transmission of the integral resource unit.

In some embodiments, the method differs from that shown in FIG. 19 in that, in the step S33, the integral resource unit will not be transmitted by the base station if a channel is monitored as being busy. Thus, the base station needs not to postpone the transmission of the integral resource unit, which reduces the complexity of the system.

In some embodiments, the postponed time indicated by the base station is carried in the demodulation reference signal in the PBCH, in the master information block in the PBCH, or in the demodulation reference signal in the physical downlink control channel associated with the SS-block.

In some embodiments, the demodulation reference signal in the PBCH carries the postponed time indicated by the base station. Thus, the user equipment may obtain the postponed time indicated by the base station by detecting the demodulation reference signal in the PBCH only.

In some embodiments, the master information block in the PBCH carries the postponed time indicated by the base station. Thus, the postponed time indicated by the base station is encoded into the master information block, reducing the probabilities of false positive and false alarm.

In some embodiments, the demodulation reference signal in the physical downlink control channel associated with the SS-block carries the postponed time indicated by the base station. Thus, the user equipment may obtain the postponed time indicated by the base station by detecting the demodulation reference signal in the physical downlink control channel only.

Figure 21:
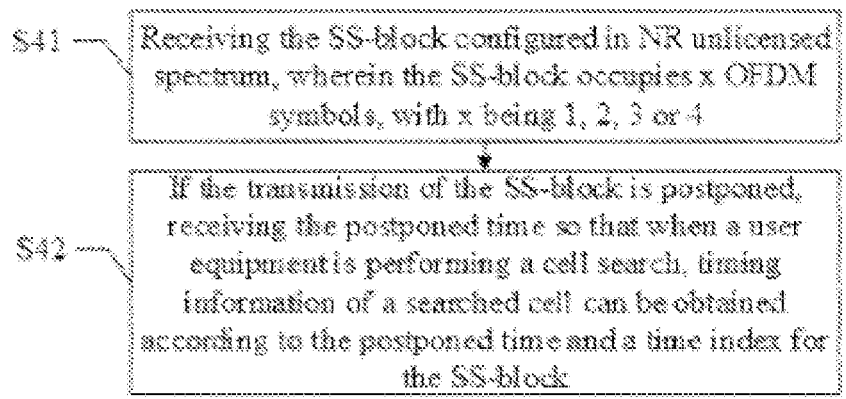
FIG. 21 is a flowchart of the method for receiving SS-block according to an embodiment of the present disclosure.

Referring to FIG. 21 which is the flow chart of the method for receiving SS-block according to an embodiment of the present disclosure, the method for receiving SS-block may include:

step S41 of receiving the SS-block configured in NR unlicensed spectrum, wherein the SS-block occupies x OFDM symbols, with x being a positive integer no greater than 4;

step S42 of, if the transmission of the SS-block is postponed, receiving the postponed time so that when a user equipment is performing a cell search, timing information of a searched cell can be obtained according to the postponed time and a time index for the SS-block.

In some embodiments, before the OFDM symbols occupied by the SS-block there are y OFDM symbols. These y OFDM symbols are occupied by a physical downlink control channel, a control resource set, channel state information reference signal or demodulation reference signal, wherein y is zero or a positive integer.

More details about the working principles and working methods of the method for receiving SS-block according to the present embodiment can be found in the descriptions with reference to FIGS. 1 to 19, and will not be repeated here.

FIG. 21 shows a device for transmitting S S-block according to an embodiment of the present disclosure, comprising a memory 211 and a processor 212, wherein the memory 211 stores a computer program executable on the processor 212 for implementing the steps of the afore-described method, and the processor 212 executes the program to implement the afore-described steps. The memory 211 may include a ROM, a RAM, a magnetic disk, an optical disk, etc. The steps described in the foregoing will not be repeated here.

Figure 22:
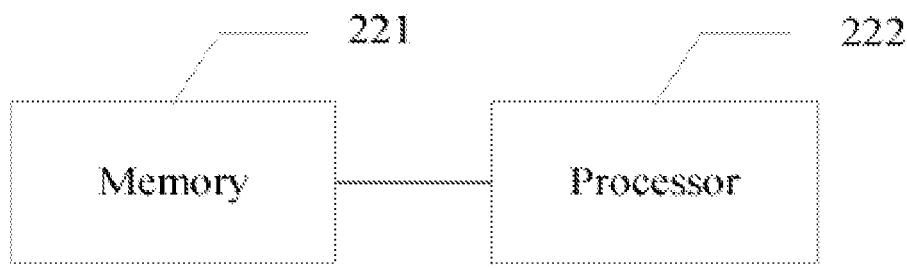
FIG. 22 is a structure diagram of the device for transmitting SS-block according to an embodiment of the present disclosure.

FIG. 22 shows a device for receiving SS-block according to an embodiment of the present disclosure, comprising a memory 221 and a processor 222, wherein the memory 221 stores a computer program executable on the processor 222 for implementing the steps of the afore-described method, and the processor 222 executes the program to implement the afore-described steps. The memory 221 may include a ROM, a RAM, a magnetic disk, an optical disk, etc. The steps described in the foregoing will not be repeated here.

Although the present disclosure is described in the foregoing, it is not limited thereto. Without departing the spirits and the scope of the present disclosure, a number of variations and modifications may occur to one skilled in the art. Therefore, the protection scope of the present disclosure should be defined by the claims.

What is claimed is:

1. A method performed by a base station for transmitting a Synchronization Signal block (SS-block), said method comprising:

configuring the SS-block in a New Radio (NR) unlicensed spectrum, wherein the SS-block occupies x OFDM symbols, with x being a positive integer no greater than 4;

performing pre-transmission monitoring;

in response to having found, as a result of having performed the pre-transmission monitoring, that the channel is idle, transmitting an integral resource unit to a user equipment at a preset transmission timing, wherein the integral resource unit includes the SS-block and y OFDM symbols, y is zero or a positive integer, and the y OFDM symbols comprise a control resource set, and in response to having found, as a result of having performed the pre-transmission monitoring, that the channel is busy, postponing the transmission of the integral resource unit and indicating a postponed time to the user equipment, wherein one or more integral resource unit is configured to be transmitted in a measurement window, and the preset transmission timing for the one or more integral resource unit is set in preset OFDM symbols.

2. The method for transmitting the SS-block according to claim 1, wherein the SS-block comprises a Primary Synchronization Signal (PSS), a Secondary Synchronization Signal (SSS), and a Physical Broadcast Channel (PBCH).

3. The method for transmitting the SS-block according to claim 2, wherein, when the SS-block occupies 1 OFDM symbol, the PSS, the SSS, and the PBCH are configured to occupy the 1 OFDM symbol in a manner of frequency-division multiplexing.

4. The method for transmitting the SS-block according to claim 2, wherein, when the SS-block occupies 2 OFDM symbols, the PSS and the SSS are configured to occupy 1 OFDM symbol in a manner of frequency-division multiplexing and the PBCH is configured to occupy 1 OFDM symbol.

5. The method for transmitting the SS-block according to claim 2, wherein, when the SS-block occupies 2 OFDM symbols, each of the PSS and the SSS is configured to occupy 1 OFDM symbol, and the 2 OFDM symbols occupied by the PSS and the SSS are subjected to a frequency division multiplexing by the PBCH.

6. The method for transmitting the SS-block according to claim 2, wherein, when the SS-block occupies 3 OFDM symbols, each of the PSS, the SSS, and the PBCH is configured to occupy 1 OFDM symbol.

7. The method for transmitting the SS-block according to claim 5, wherein the PBCH is configured to utilize a frequency domain resource in the OFDM symbols occupied by the PSS and the SSS.

8. The method for transmitting the SS-block according to claim 2, wherein, when the SS-block occupies 3 OFDM symbols, the PSS and the SSS are configured to occupy 1 OFDM symbol in a manner of frequency division multiplexing and the PBCH is configured to occupy 2 OFDM symbols.

9. The method for transmitting the SS-block according to claim 2, wherein, when the SS-block occupies 4 OFDM symbols, the PSS is configured to occupy 1 OFDM symbol, the SSS is configured to occupy 1 OFDM symbol, and the PBCH is configured to occupy 2 OFDM symbols.

10. The method for transmitting the SS-block according to claim 9, wherein the PBCH is configured to utilize a frequency-domain resource in the OFDM symbol occupied by the SSS.

11. The method for transmitting the SS-block according to claim 3, wherein the PBCH is configured to occupy P consecutive physical resource blocks and wherein P is a number of physical resource blocks occupied by the PBCH in 1 SS-block.

12. The method for transmitting the SS-block according to claim 1, wherein the SS-block comprises a Primary Synchronization Signal (PSS) and a Secondary Synchronization Signal (SSS).

13. The method for transmitting the SS-block according to claim 12, wherein, when the SS-block occupies 1 OFDM symbol, the PSS and the SSS are configured to occupy the symbol in a manner of frequency division multiplexing.

14. The method for transmitting the SS-block according to claim 12, wherein when the SS-block occupies 2 OFDM symbols, the PSS is configured to occupy 1 OFDM symbol, and the SSS is configured to occupy 1 OFDM symbol.

15. The method for transmitting the SS-block according to claim 1, wherein the y OFDM symbols further comprise a channel state information reference signal.

16. The method for transmitting the SS-block according to claim 1, wherein a plurality of the integral resource units is subjected to a frequency division multiplexing.

17. The method for transmitting the SS-block according to claim 1, further comprising in response to channel being found to be idle, transmitting the integral resource unit to a user equipment at the preset transmission timing; and, in response to the channel being found to be busy, cancelling the transmission of the integral resource unit.

18. The method for transmitting the SS-block according to claim 1, wherein the postponed time indicated by the base station is carried by a demodulation reference signal in the PBCH, by a master information block in the PBCH, or by a demodulation reference signal in the physical downlink control channel associated with the SS-block.

19. The method for transmitting the SS-block according to claim 1, wherein the preset subcarrier spacing is 30 kHz.

20. The method for transmitting the SS-block according to claim 1, wherein the preset subcarrier spacing is 60 KHz.

21. The method for transmitting the SS-block according to claim 1, wherein when x is 1, 2, or 3, a base station is configured to transmit 4 SS-blocks in one time slot.

22. The method for transmitting the SS-block according to claim 1, wherein, when x is 1, a base station is configured to transmit 8 SS-blocks in one time slot.

23. A device for transmitting a Synchronization Signal block (SS-block), said device comprising: a memory and a processor, wherein the memory stores a computer program executable on the processor to cause the processor to configure the SS-block in a New Radio (NR) unlicensed spectrum, wherein the SS-block occupies x OFDM symbols, with x being a positive integer no greater than 4; wherein the computer program, when executed on the processor, causes the device:
to perform pre-transmission monitoring;
in response to having found, as a result of having performed the pre-transmission monitoring, that the channel is idle, to transmit an integral resource unit to a user equipment at a preset transmission timing, wherein the integral resource unit includes the SS-block and y OFDM symbols, y is zero or a positive integer, and the y OFDM symbols comprise a control resource set; and
in response to having found, as a result of having performed the pre-transmission monitoring, that the channel is, to postpone the transmission of the integral resource unit and indicate a postponed time to the user equipment;
wherein one or more integral resource unit is configured to be transmitted in a measurement window, and the preset transmission timing for the one or more integral resource unit is set in preset OFDM symbols.

24. The device for transmitting the SS-block according to claim 23, wherein the SS-block comprises a Primary Synchronization Signal (PSS), a Secondary Synchronization Signal (SSS), and a Physical Broadcast Channel (PBCH).

25. The device for transmitting the SS-block according to claim 24, wherein, when the SS-block occupies 1 OFDM symbol, the PSS, the SSS, and the PBCH are configured to occupy the 1 OFDM symbol in a manner of frequency-division multiplexing.

26. The device for transmitting the SS-block according to claim 24, wherein, when the SS-block occupies 2 OFDM symbols, the PSS and the SSS are configured to occupy 1 OFDM symbol in a manner of frequency division multiplexing and the PBCH is configured to occupy 1 OFDM symbol.

27. The device for transmitting the SS-block according to claim 24, wherein, when the SS-block occupies 2 OFDM symbols, each of the PSS and the SSS is configured to occupy 1 OFDM symbol, and the 2 OFDM symbols occupied by the PSS and the SSS are subjected to a frequency division multiplexing by the PBCH.

28. The device for transmitting the SS-block according to claim 24, wherein, when the SS-block occupies 3 OFDM symbols, each of the PSS, the SSS, and the PBCH is configured to occupy 1 OFDM symbol.

29. The device for transmitting the SS-block according to claim 27, wherein the PBCH is configured to utilize a frequency domain resource in the OFDM symbols occupied by the PSS and the SSS.

30. The device for transmitting the SS-block according to claim 24, wherein, when the SS-block occupies 3 OFDM symbols, the PSS and the SSS are configured to occupy 1 OFDM symbol in a manner of frequency division multiplexing and the PBCH is configured to occupy 2 OFDM symbols.

31. The device for transmitting the SS-block according to claim 24, wherein, when the SS-block occupies 4 OFDM symbols, the PSS is configured to occupy 1 OFDM symbol, the SSS is configured to occupy 1 OFDM symbol, and the PBCH is configured to occupy 2 OFDM symbols.

32. The device for transmitting the SS-block according to claim 31, wherein the PBCH is configured to utilize a frequency-domain resource in the OFDM symbol occupied by the SSS.

33. The device for transmitting the SS-block according to claim 25, wherein the PBCH is configured to occupy P consecutive physical resource blocks and wherein P is a number of physical resource blocks occupied by the PBCH in 1 SS-block.

34. The device for transmitting the SS-block according to claim 23, wherein the SS-block comprises a Primary Synchronization Signal (PSS) and a Secondary Synchronization Signal (SSS).

35. The device for transmitting the SS-block according to claim 34, wherein, when the SS-block occupies 1 OFDM symbol, the PSS and the SSS are configured to occupy the OFDM symbol in a manner of frequency division multiplexing.

36. The device for transmitting the SS-block according to claim 34, wherein, when the SS-block occupies 2 OFDM symbols, the PSS is configured to occupy 1 OFDM symbol, and the SSS is configured to occupy 1 OFDM symbol.

37. The device for transmitting the SS-block according to claim 23, wherein the y OFDM symbols further comprise a channel state information reference signal.

38. The device for transmitting the SS-block according to claim 23, wherein a plurality of the integral resource units is frequency-multiplexed.

39. The device for transmitting the SS-block according to claim 23, wherein, the computer program further causes the processor to: in response to the channel being found to be idle, transmit the integral resource unit to a user equipment at the preset transmission timing; and in response to channel being found to be busy, cancel the transmission of the integral resource unit.

40. The device for transmitting the SS-block according to claim 23, wherein the postponed time indicated by the base station is carried by a demodulation reference signal in the PBCH, by a master information block in the PBCH, or by a demodulation reference signal in a physical downlink control channel associated with the SS-block.

41. The device for transmitting the SS-block according to claim 23, wherein the preset subcarrier spacing is 30 kHz.

42. The device for transmitting the SS-block according to claim 23, wherein the preset subcarrier spacing is 60 KHz.

43. The device for transmitting the SS-block according to claim 23, wherein, when x is 1, 2, or 3, a base station is configured to transmit 4 SS-blocks in one time slot.

44. The device for transmitting the SS-block according to claim 23, wherein, when x is 1, a base station is configured to transmit 8 SS-blocks in one time slot.

45. A non-transitory computer readable storage medium storing thereon computer instructions, wherein the computer instructions when executed by a processor cause the processor:

to configure the SS-block in a New Radio (NR) unlicensed spectrum, wherein the SS-block occupies x OFDM symbols, with x being a positive integer no greater than 4;

to perform pre-transmission monitoring;

in response having found, as a result of having performed the pre-transmission monitoring, that the channel is idle, to transmit an integral resource unit to a user equipment at a preset transmission timing, wherein the integral resource united includes the SS-block and y OFDM symbols, wherein y is zero or a positive integer, and the y OFDM symbols comprise a control resource set; and in response to having found, as a result of having performed the pre-transmission monitoring, that the channel is busy, to postpone the transmission of the integral resource unit and indicating a postponed time to the user equipment;

wherein one or more integral resource unit is configured to be transmitted in a measurement window, and the preset transmission timing for the integral resource unit is set in preset OFDM symbols.

* * * * *